United States Patent
Nakagawa

(10) Patent No.: US 7,793,695 B2
(45) Date of Patent: Sep. 14, 2010

(54) PNEUMATIC RADIAL TIRE FOR MOTORCYCLE

(75) Inventor: Hidemitsu Nakagawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 385 days.

(21) Appl. No.: 11/886,334

(22) PCT Filed: Feb. 16, 2006

(86) PCT No.: PCT/JP2006/302767

§ 371 (c)(1),
(2), (4) Date: Sep. 14, 2007

(87) PCT Pub. No.: WO2006/098112

PCT Pub. Date: Sep. 21, 2006

(65) Prior Publication Data

US 2008/0190537 A1 Aug. 14, 2008

(30) Foreign Application Priority Data

Mar. 16, 2005 (JP) .............................. 2005-075703

(51) Int. Cl.
*B60C 9/18* (2006.01)
*B60C 9/22* (2006.01)
*B60C 15/00* (2006.01)

(52) U.S. Cl. ...................... 152/526; 152/531; 152/534; 152/538

(58) Field of Classification Search ................. 152/555, 152/526, 527, 528, 529, 530, 531, 532, 533, 152/534, 535, 536, 537, 538

See application file for complete search history.

(56) References Cited

FOREIGN PATENT DOCUMENTS

| JP | 05-178004 A | | 7/1993 |
| JP | 05-246210 A | | 9/1993 |
| JP | 6-32111 | * | 2/1994 |
| JP | 09-175123 A | | 7/1997 |
| JP | 2000-1107 | * | 1/2000 |
| JP | 2000-211317 A | | 8/2000 |
| JP | 2001-334812 A | | 12/2001 |
| JP | 2002-019413 A | | 1/2002 |
| JP | 2003-039916 A | | 2/2003 |
| WO | WO 03/095242 A1 | | 11/2003 |
| WO | WO 2004/018236 | * | 3/2004 |

OTHER PUBLICATIONS

Machine translation of JP 2000-1107, 2000.*
Machine translation of JP 05-246210, 1993.*

* cited by examiner

*Primary Examiner*—Justin Fischer
(74) *Attorney, Agent, or Firm*—Sughrue Mion, PLLC

(57) ABSTRACT

There is provided a pneumatic radial tire for a motorcycle whose turning stability is improved by achieving both grounding performance and lateral rigidity at high level. A mono-spiral belt (MSB) (3) includes steel cords whose tensile break strength is 5.9 Pa or more. A value Tc of a number of driven cords in the MSB (per 25 mm in width) at an equator of the tire and a value Ts at shoulder parts thereof meet requirements of $17 \leq Tc \leq 24$ and $0.6 \leq Ts/Tc \leq 0.9$. A disposed width BW of the MSB meets a requirement of $0.6 \leq BW/TW \leq 1.0$. At least one textile-reinforcing layer having tensile break strength of 5.9 Pa or more is disposed at both ends of the MSB while overlapping with the MSB. An overlap of the MSB with the textile-reinforcing layer is 4 to 10 times of the diameter D of the steel cords in the MSB.

8 Claims, 3 Drawing Sheets

PNEUMATIC RADIAL TIRE FOR MOTORCYCLE

TECHNICAL FIELD

The present invention relates to a pneumatic radial tire for a motorcycle (referred to also simply as "tire" hereinafter) and more specifically to a pneumatic radial tire for a motorcycle whose running stability is assured at high level by achieving the stability both in running straight and in turning.

BACKGROUND ART

In general, it is required to optimize rigidity balance of a center part and a shoulder part of a tire of a motorcycle in order to achieve stability both in running straight and in turning because a grounding part shifts largely from the center part to the shoulder part in cases of running straight to turning.

Conventionally, although a method of enhancing a grounding performance by adopting a so-called mono-spiral belt (MSB) structure for a rear tire has been taken as means for improving the stability of the motorcycle, the mono-spiral belt structure has been apt to be pointed out that it lacks stability due to a lack of lateral rigidity for motorcycles having a heavy weight and large horse power. Therefore, a method has been taken so as to improve convergence of vibrations after input of disturbance by changing a cord material of the belt from Kepler to steel whose rigidity is higher and which enhances lateral rigidity of a tread.

However, it has been unable to assure enough stability by the above-mentioned methods because flexural rigidity of the tread part is also enhanced and a lack of lateral force occurs due to a lack of grounding area in turning when an especially large lateral force is required.

As technologies of improving stability of a tire of a motorcycle by enhancing the rigidity, Patent Document 1 describes a pneumatic radial tire for a motorcycle whose controllability and stability are remarkably improved without lowering driving comfortableness by assuring homogeneous and adequate tire-case rigidity across the whole range of a tire side portion by adopting a structure of winding up a first carcass ply to an end of a belt and sandwiching and arresting it between a belt end region and the carcass layer and by extending a second carcass ply at least from the belt end region to a bead portion beyond position of a maximum width of the carcass ply. Further, for the purpose of achieving both comfortableness in running straight and a feeling of rigidity in turning, Patent Document 2 describes a tire for a motorcycle having belt layers disposed on the outside of a carcass in a tire radial direction and within a tread part, wherein the carcass has a continuous toroidal ply and a split ply, that is hollow in a tread center part, having an outer edge in a tire radial direction on the outside of a tire equator in a tire axial direction and on the inside of an outer edge of the belt layer in the tire axial direction and composed of a pair of right and left split ply pieces extending from the outer edge through the inside in the tire radial direction to a bead core.

Patent Documents 3 and 4 also describe technologies for improving stability of a radial tire for a motorcycle having a carcass and a belt layer in which cords are wound in spiral at low angle with respect to a tire equator.

Patent Document 1: Japanese Patent Laid-open No. 2000-211317 gazette (Claims and others)

Patent Document 2: Japanese Patent Laid-open No. 2003-39916 gazette (Claims and others)

Patent Document 3: Japanese Patent Laid-open No. 5-178004 gazette (Claims and others)

Patent Document 4: Japanese Patent Laid-open No. 5-246210 gazette (Claims and others)

DISCLOSURE OF INVENTION

Problems to be Solved by the Invention

Although the stability has been improved by a certain degree by enhancing the lateral rigidity of the tread portion as described above in the improvement in which the conventional MSB cord is changed to steel, it has been necessary on the other hand to reduce out-of-plane flexural rigidity (flexural rigidity in a longitudinal direction) adequately as for a shoulder part that grounds in turning in which a specially large lateral force is required in order to assure a large grounding area.

However, although it has been confirmed that the out-of-plane flexural rigidity of the shoulder part that grounds in turning is reduced and the grounding area increases, thus increasing the lateral force, by reducing a number of driven steel MSBs of the shoulder part for the purpose described above, it has been also confirmed that an unstable behavior such as shakiness occurs in turning because the lateral rigidity is reduced in the same time and the lateral rigidity for supporting the large lateral force cannot be assured. Thus, the assurance of the lateral rigidity and of the grounding area in turning are antinomic and a technology capable of meeting the both requirements in the same time has been required.

Accordingly, it is an object of the invention to provide a pneumatic radial tire for a motorcycle whose stability in turning is improved by eliminating the above-mentioned antinomic problem of the grounding performance and the lateral rigidity in turning and by achieving the both at high level.

Means for Solving the Problem

As a result of ardent study, the inventor consummated the invention by finding that the above-mentioned problem may be solved by adopting the following configuration.

That is, a pneumatic radial tire for a motorcycle of the invention having a tread portion formed in a shape of ring, a pair of sidewall portions disposed inside from both sides of the tread portion in a tire radial direction and a bead portion continuing on the inside of the sidewall portions in the tire radial direction comprises: a carcass ply composed of at least one layer of textile cords to reinforce those respective portions mutually between bead cores; respectively embedded in the bead portions and at least one layer of mono-spiral belt for reinforcing the tread portion around the carcass ply: wherein the mono-spiral belt includes steel cords whose tensile break strength is 147 MPa or more;

a value Tc of a number of driven cords of the mono-spiral cords (per 25 mm in width) at an equator of the tire and a value Ts at shoulder parts thereof meet requirements of $17 \leq Tc \leq 24$ and $0.6 \leq Ts/Tc \leq 0.9$;

a disposed width BW of the mono-spiral cords meets a requirement of $0.6 \leq BW/TW \leq 1.0$ with respect to a total width TW of the crown portion in a no-load state in which the belt is attached to a standard rim and a standard inner pressure is filled;

at least one layer of a textile-reinforcing layer having a tensile break strength of 98 MPa or more is disposed at both ends of the mono-spiral belt; and an overlap of the mono-spiral belt with the textile-reinforcing layer is 4 to 10 times of a diameter D of the steel cords of the mono-spiral belt.

According to the invention, end portions of the textile-reinforcing layer are preferably disposed on the inside of the mono-spiral belt in the tire radial direction. Still more, the textile-reinforcing layer is preferably composed of one or more combinations selected from groups including the following textile-structuring members:

(A) a folded-back portion of the carcass ply;

(B) an upper end portion of a flipper disposed so as to contain the bead core and a bead apex disposed on the outside thereof in the tire radial direction;

(C) an upper end portion of a chafer ply disposed on the inside of the folded-back portion of the carcass ply in the tire radial direction; and (D) an upper end portion of a side-reinforcing ply disposed below to above the position of a maximum tire width.

Furthermore, according to the invention, it is preferable to dispose a side-reinforcing outer rubber layer (a) whose JIS-A hardness is more 55 and less than 90;

(b) whose thickness t meets a requirement of $0.1 \leq t/BCW \leq 0.7$ with respect to the bead core maximum width BCW; and (c) height H from a bead heel portion to an upper end thereof and its length L disposed in the tire radial direction meet requirements of $0.3 \leq H/SH \leq 0.9$ and $0.1 \leq L/SH \leq 0.7$, respectively, with respect to the height SH from the bead heel portion to the end of the crown in a no-load state in which the belt is attached to a standard rim and a standard inner pressure is filled.

Here, the standard is standards defined by industrial standards effective in regions in which tires are produced or used. For instance, it is defined in "the Year Book of The Tire and Rim Association Inc." in the United States, "the Standard Manual of The European Tire and Rim Technical Organization" in Europe and "the JATMA Year Book" of The Japan Automobile Tire Association in Japan. Accordingly, the standard inner pressure is air pressure to the maximum load (maximum load capacity) of a single wheel in the applied size described in the above-mentioned Standards and the standard rim is a standard rim (or "Approved Rim" and "Recommended Rim") in the applied size described in the above-mentioned Standards.

Effect of the Invention

It has become possible to realize the pneumatic radial tire for the motorcycle whose stability in turning is improved by achieving the both of the grounding performance and the lateral rigidity in turning at high level.

REFERENCE NUMERALS

1 Bead Core
2 Carcass Ply
3 Mono-spiral Belt
4 Bead Apex
5 Flipper
7 Chafer Ply
8 Side-reinforcing Ply
9 Side-reinforcing Outer Rubber Layer
11 Tread Portion
12 Sidewall Portion
13 Bead Portion

BEST MODE FOR CARRYING OUT THE INVENTION

Preferred embodiments of the invention will be explained in detail below.

Figure 1:
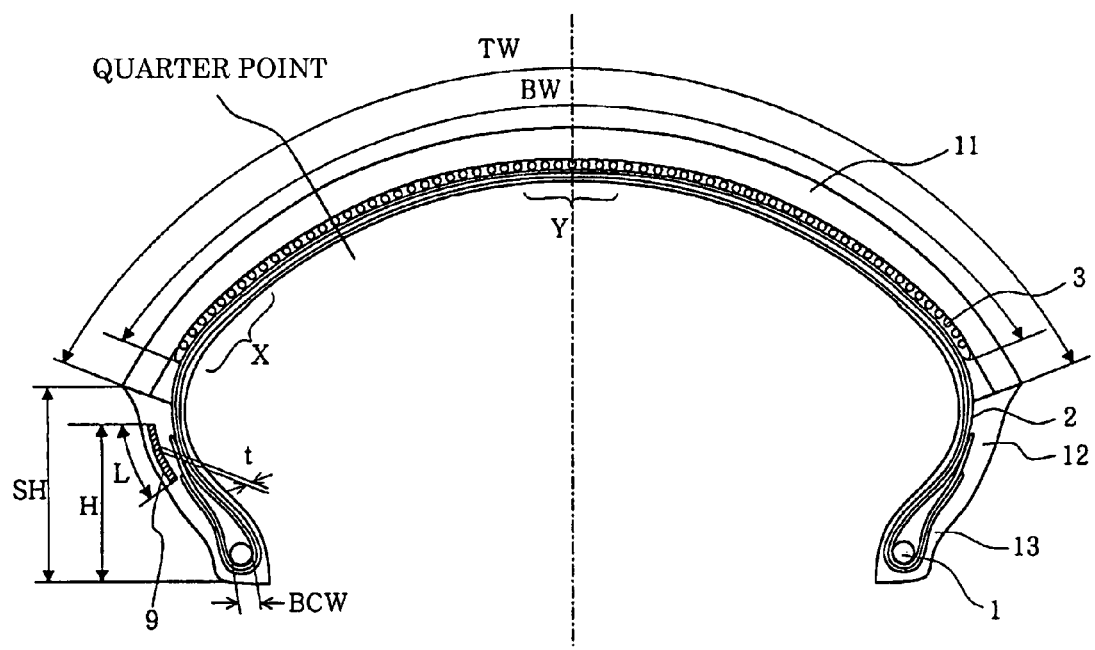
FIG. 1 is an enlarged section view of a pneumatic radial tire for a motorcycle according to one preferred embodiment of the invention.

FIG. 1 is an enlarged section view of a pneumatic redial tire for a motorcycle according to the invention. As shown in the figure, the tire of the invention having a tread portion 11 formed in a shape of ring, a pair of sidewall portions 12 disposed on the inside from the both side portions thereof in a tire radial direction and a bead portion 13 continuing on the inside thereof in the tire radial direction includes a carcass ply 2 composed of at least one layer of textile cords to reinforce the parts mutually between the bead cores 1 in which each portion is embedded respectively within a bead portion 13, and at least one layer of mono-spiral belt (MSB) 3 for reinforcing the tread portion 11 around the carcass ply 2.

In order to assure the stability by achieving the both of the large lateral force-required in turning and the lateral rigidity for supporting it, the tire of the invention is required to meet the following requirements.

At first, it is necessary to use a steel cord whose tensile break strength is 147 MPa or more as the MSB to improve the stability. It is unable of assure enough lateral rigidity and enough stability when the tensile break strength is 147 MPa or less.

Furthermore, in order to assure a large grounding area to assure the lateral force in turning, it is necessary to meet a requirement that a value Ts of a number of driven MSBs (per 25 mm in width) in the shoulder part X that grounds in turning is in the following range in which that value is smaller than a value Tc in a tire equator Y:

$0.6 \leq Ts/Tc \leq 0.9$

The Tc in the tire equator Y meets the following range:

$17 \leq Tc \leq 24$

Here, the shoulder part X refers to an arbitrary range from a quarter point that divides a crown portion into quarters to a side edge of the shoulder.

When the Ts/Tc is smaller than 0.6, a linearity of handling is hampered, disabling stable running, because a difference of rigidity of the tire equator X and the shoulder part Y is too large. On the other hand, the effect of improving the grounding performance is small if this value is larger than 0.9. Furthermore, the number of driven MSB Tc in the tire equator Y must be more than 17 and less than 24 per width of 25 mm in order to assure the stability in running straight. If the number Tc in the tire equator Y is smaller than 17, the stability drops because of a lack of lateral rigidity. If it is larger than 24, enough grounding performance cannot be assured because the grounding area becomes small.

Furthermore, the disposed width BW of the MSB must meet the following range with respect to a total width of the crown portion in a no-load state in which it is attached to a standard rim and standard inner pressure is filled:

$$0.6 \leq BW/TW \leq 1.0$$

When the value of BW/TW is less than 0.6, the stability drops because enough lateral rigidity cannot be assured. When the value exceeds 1.0 on the other hand, the grounding performance in turning is hampered because the flexural rigidity of the side portion increases.

Furthermore, in order to assure the lateral rigidity in turning, it is necessary to provide at least one layer of a textile-reinforcing layer at the both end portions of the MSB by overlapping with the mono-spiral belt to increase the reinforcing effect of the side portions by a binding effect of the textile-reinforcing layer. A value of overlap of the mono-spiral belt and the textile-reinforcing layer is more than 4 times and less than 10 times of a diameter D of the steel cord of the mono-spiral belt. If the value is less than 4 times, the reinforcing effect becomes insufficient and if the value exceeds 10 times, an increase of rigidity of the overlapped portion drops the absorptivity. Still more, the tensile break strength of the textile-reinforcing layer must be 98 MPa or more. When the tensile break strength is less than 98 MPa, the reinforcing effect becomes insufficient.

Here, the edge portion of the textile-reinforcing layer is preferable to be disposed below the mono-spiral belt, i.e., on the inside of the mono-spiral belt in the tire radial direction. It is preferable to dispose it below the mono-spiral belt because it is difficult to dispose it on the mono-spiral belt in terms of production and cracks apt to be caused from the edge portion.

Figure 2:
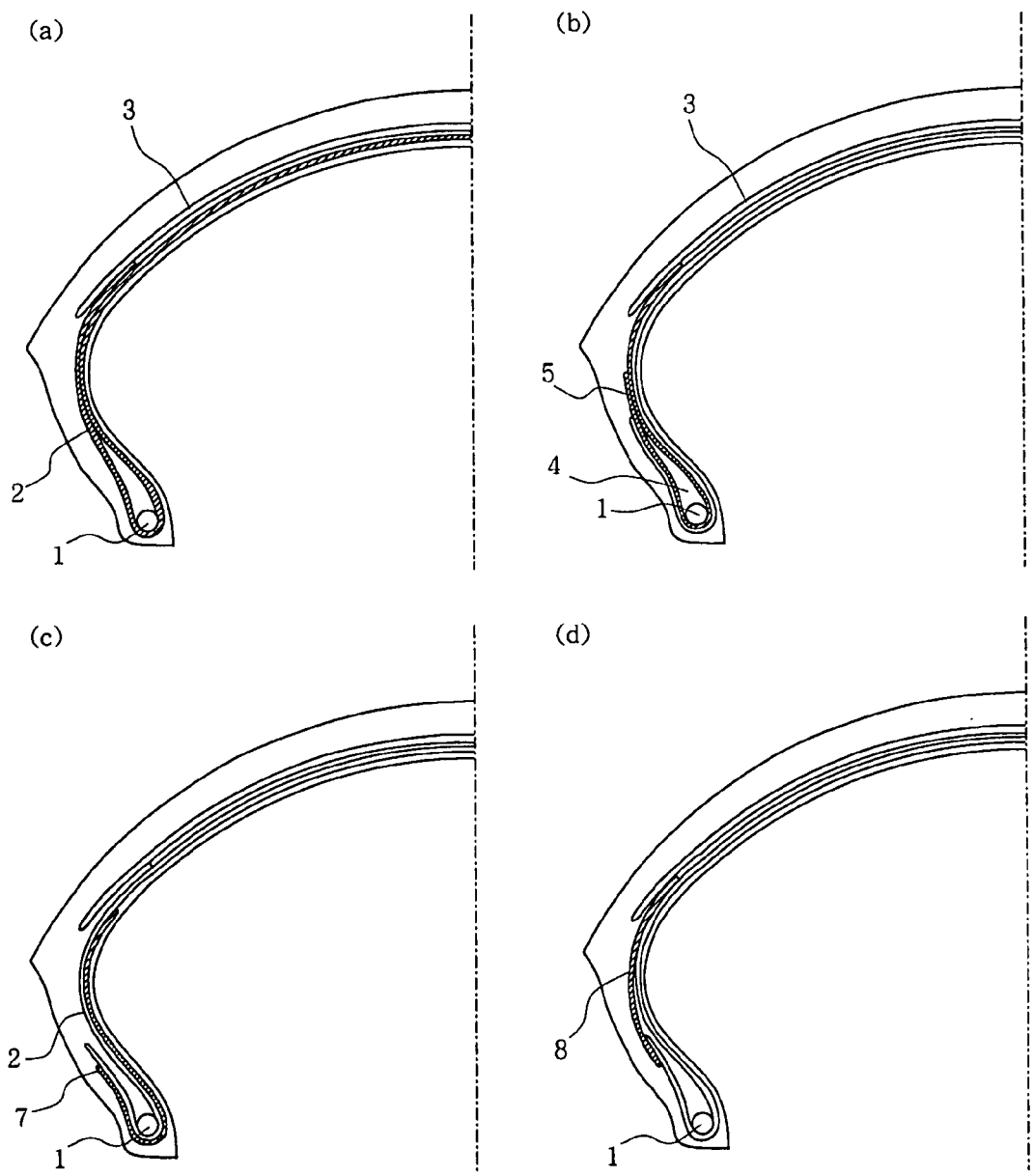
FIGS. 2(a) through 2(d) are enlarged partial section views respectively showing textile structuring members composing a textile-reinforcing layer of the invention.

Such textile-reinforcing layer may be formed by extending a folded-back portion of the carcass ply 2 wound up around the bead core 1 or a side-reinforcing member to the end of the mono-spiral belt. More specifically, the textile-reinforcing layer exhibits its effect by composing it by combinations of more than one selected from groups including the following textile-structuring members shown in FIGS. 2(*a*) through 2(*d*):

(A) the folded-back portion of the carcass ply 2 (FIG. 2(*a*));

(B) an upper end portion of a flipper 5 disposed so as to contain the bead core 1 and a bead apex 4 disposed on the outside thereof in the tire radial direction (FIG. 2(*b*)):

(C) an upper end portion of a chafer ply 7 disposed on the inside of the folded-back portion of the carcass ply 2 in the tire radial direction (FIG. 2(*c*)): and (D) an upper end portion of a side-reinforcing ply 8 disposed below to above the position of a maximum tire width (FIG. 2(*d*)).

Figure 3:
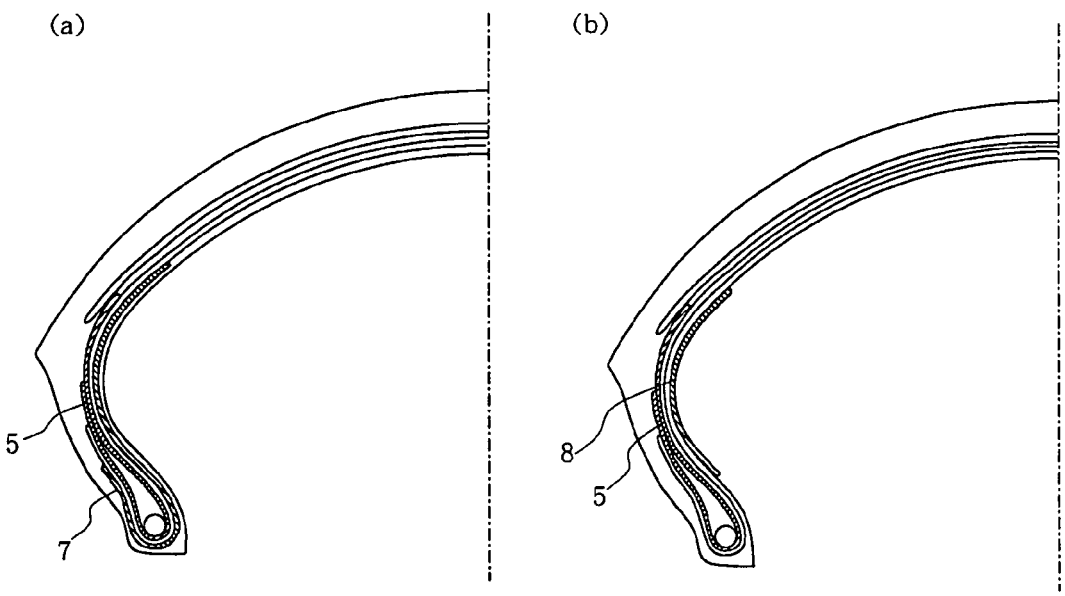
FIGS. 3(a) and 3(b) are enlarged partial section views showing other exemplary structures of the textile-reinforcing layer of the invention.

FIGS. 3(*a*) and 3(*b*) show examples composing the textile-reinforcing layer by a combination of (B) the upper end portion of the flipper 5 and (C) the upper end portion of the chafer ply 7 and a combination of (B) the upper end portion of the flipper 5 and (D) the upper end portion of the side-reinforcing ply 8.

Furthermore, in order to improve the lateral rigidity in turning, it is preferable to suppress deformation by disposing a side-reinforcing outer rubber layer 9 that is a hard rubber layer on the outside of the side portion where a large compressive strain occurs as the side portion deforms in turning. More specifically, the side-reinforcing outer rubber layer 9 is disposed on the inside of the sidewall rubber as shown in FIG. 1.

Hardness of the side-reinforcing outer rubber layer 9 is preferred to be more than 55 and less than 90 in terms of JIS-A hardness. The effect is small when the JIS-A hardness is less than 55 and the aggravation of absorptivity becomes remarkable due to lack of deformability of the side when the value exceeds 90. A thickness t of the side-reinforcing outer rubber layer 9 is preferable to meet a requirement of $0.1 \leq BCW \leq 0.7$ with respect to a maximum width BCW of the bead core 1. The effect is small when this value is less than 0.1 and the aggravation of absorptivity becomes remarkable when the value exceeds 0.7.

Height of the upper end portion of the side-reinforcing outer rubber layer 9, i.e., a height H from a bead heel portion to the upper end portion thereof, preferably meets a requirement of $0.3 \leq H/SH \leq 0.9$ with respect to height SH from the bead heel portion to the end of crown in the no-load state in which it is attached to the standard rim and the standard inner pressure is filled. The effect is small if this value is less than 0.3 and the absorptivity drops if the value is larger than 0.9. Furthermore, a length L of the side-reinforcing outer rubber layer 9 disposed in the tire radial direction is preferable to meet a requirement of $0.1 \leq L/SH \leq 0.7$ with respect to the height SH from the bead heel portion to the end of the crown. The effect is small if this value is less than 0.1 and the absorptivity drops if the value exceeds 0.7.

Figure 4:
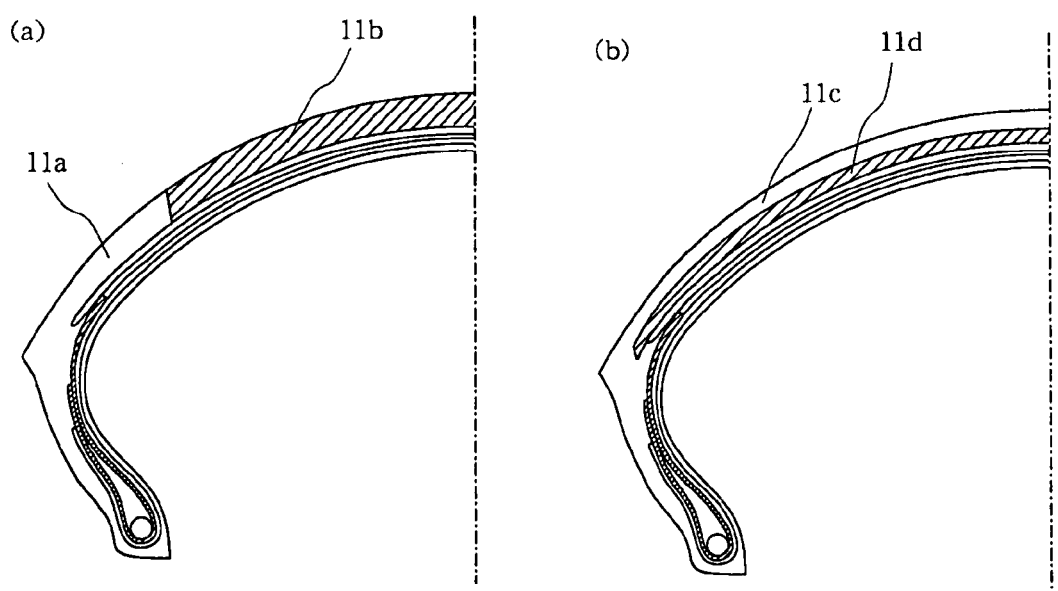
FIGS. 4(a) and 4(b) are enlarged partial section views showing pneumatic radial tires for a motorcycle according to another preferred embodiment of the invention.

It is important only to meet the above-mentioned conditions for the tire of the invention and other conditions such as concrete tire structures, materials and others are not specifically limited and may be adequately set corresponding to aimed tire performance and the like by known technologies. For example, the tread rubber may have a structure in which it is split in the width direction to a shoulder region 11*a* and a center region 11*b* or a cap/base structure in which it is split in the thickness direction to a cap rubber 11*c* and a base rubber lid as shown in FIGS. 4(*a*) and 4(*b*).

Embodiments

The invention will be explained below in detail by using embodiments thereof.

Sample tires of respective embodiments having the structure shown in FIG. 1 and comparative examples were fabricated with MCR 180/55ZR17M/C of tire size, MT5. 5X17 of rim size and 250 kPa of inner pressure.

For each sample tire, the tensile break strengths of the steel cord of the mono-spiral belt and the textile-reinforcing layer are 539 MPa and 225 MPa and the conditions of the value Tc of the number of driven MSBs in the tire equator (per 25 mm in width), the ratio Ts/Tc of the number Ts of mono-spiral belts at the shoulder part to the number TC of driven mono-spiral belts at the tire equator, the ratio BW/TW of the mono-spiral belt disposed width BW to the crown total width TW, the overlapping value of the MSB and the textile-reinforcing layer (×diameter D of the steel cord of the mono-spiral belt) the ratio t/BCW of the thickness t of the side-reinforcing outer rubber layer 9 (JIS-A hardness: 91) to the bead core maximum width BCW, the ratio H/SH of the height H of the bead heel portion to the upper end of the side-reinforcing outer rubber layer 9 to the height SH of the bead heel portion to the end of the crown and the ratio L/SH of the length of the side-reinforcing outer rubber layer 9 disposed in the tire radial direction to the height SH from the bead heel portion to the end of the crown were set following to Table 1 below.

Each obtained sample tire was mounted to a motorcycle of 1000 cc of displacement to evaluate the controllability and stability by the actual motorcycle. Its result is shown also in Table 1 below by indices. The larger the value, the better the result was.

TABLE 1

|  | Tc (number) | Ts/Tc | BW/TW | Overlap value (×D) | t/BCW | H/SH | L/SH | Stability (indices) |
|---|---|---|---|---|---|---|---|---|
| Embodiment 1 | 20 | 0.7 | 0.8 | 10 | 0.3 | 0.7 | 0.3 | 125 |
| Embodiment 2 | 20 | 0.9 | 0.8 | 10 | 0.3 | 0.7 | 0.3 | 105 |
| Embodiment 3 | 23 | 0.7 | 0.8 | 10 | 0.3 | 0.7 | 0.3 | 110 |
| Embodiment 4 | 20 | 0.7 | 0.8 | 10 | 0.3 | 0.7 | 0.6 | 120 |
| Comparative Example 1 | 25 | 0.7 | 0.8 | 10 | 0.3 | 0.7 | 0.3 | 98 |
| Comparative Example 2 | 20 | 0.4 | 0.8 | 10 | 0.3 | 0.7 | 0.3 | 90 |
| Embodiment 5 | 20 | 0.7 | 0.8 | 10 | 0.9 | 0.7 | 0.3 | 115 |
| Embodiment 6 | 20 | 0.7 | 0.8 | 10 | 0.3 | 0.2 | 0.3 | 105 |
| Embodiment 7 | 20 | 0.7 | 0.8 | 10 | 0.3 | 0.7 | 0.9 | 105 |
| Comparative Example 3 | 20 | 0.7 | 0.8 | 3 | 0.3 | 0.7 | 0.3 | 101 |
| Comparative Example 4 | 20 | 0.7 | 0.5 | 10 | 0.3 | 0.7 | 0.3 | 95 |
| Comparative Example 5 | 15 | 0.7 | 0.8 | 10 | 0.3 | 0.7 | 0.3 | 95 |
| Comparative Example 6 | 20 | 1.3 | 0.8 | 10 | 0.3 | 0.7 | 0.3 | 95 |
| Comparative Example 7 | 20 | 0.7 | 1.2 | 10 | 0.3 | 0.7 | 0.3 | 93 |
| Comparative Example 8 | 20 | 0.7 | 0.8 | 15 | 0.3 | 0.7 | 0.3 | 98 |

As it is apparent from Table 1 above, it was confirmed that the tires of the embodiments meeting the requirements of the invention enable one to obtain excellent stability as compare to the tires of the comparative examples. It is noted that although the comparative example 3 meets the requirement of stability to a certain degree, it has a problem in a practical use because it lacks durability due to the insufficient overlap value.

The invention claimed is:

1. A pneumatic radial tire for a motorcycle, having a tread portion formed in a shape of ring, a pair of sidewall portions disposed inside from both sides of said tread portion in a tire radial direction and a bead portion continuing on the inside of said sidewall portions in the tire radial direction, which comprises:

a carcass ply composed of at least one layer of textile cords to reinforce those respective portions mutually between bead cores respectively embedded in said bead portions; and at least one layer of mono-spiral belt for reinforcing said tread portion around said carcass ply: wherein;

said mono-spiral belt includes steel cords whose tensile break strength is 147 MPa or more;

a value Tc of a number of driven cords of said mono-spiral cords (per 25 mm in width) at an equator of the tire and a value Ts at shoulder parts thereof meet requirements of $17 \leq Tc \leq 24$ and $0.6 \leq Ts/Tc \leq 0.9$;

a disposed width BW of the mono-spiral cords meets a requirement of $0.6 \leq BW/TW \leq 1.0$ with respect to a total width TW of the crown portion in a no-load state in which the belt is attached to a standard rim and a standard inner pressure is filled;

at least one layer of a textile-reinforcing layer having a tensile break strength of 98 MPa or higher is disposed at both ends of the mono-spiral belt; and an overlap of the mono-spiral belt with the textile-reinforcing layer is 4 to 10 times of a diameter D of the steel cords of the mono-spiral belt.

2. The pneumatic radial tire for the motorcycle according to claim 1, wherein end portions of said textile-reinforcing layer are disposed on the inside of said mono-spiral belt in the tire radial direction.

3. The pneumatic radial tire for the motorcycle according to claim 1, wherein said textile-reinforcing layer is composed of one or more combinations selected from groups including the following textile structuring members:

(A) a folded-back portion of said carcass ply;

(B) an upper end portion of a flipper disposed so as to contain said bead core and a bead apex disposed on the outside thereof in the tire radial direction;

(C) an upper end portion of a chafer ply disposed on the inside of said folded-back portion of said carcass ply in the tire radial direction; and (D) an upper end portion of a side-reinforcing ply disposed below to above the position of a maximum tire width.

4. The pneumatic radial tire for the motorcycle according to claim 1, wherein a side-reinforcing outer rubber layer (a) whose JIS-A hardness is more than 55 and less than 90;

(b) whose thickness t meets a requirement of $0.1 \leq t/BCW \leq 0.7$ with respect to the bead core maximum width BCW; and (c) height H from a bead heel portion to an upper end thereof and its disposed length L in the tire radial direction meet requirements of $0.3 \leq H/SH \leq 0.9$ and $0.1 \leq L/SH \leq 0.7$, respectively, with respect to the height SH from the bead heel portion to the end of the crown in a no-load state in which the belt is attached to a standard rim and a standard inner pressure is filled.

5. The pneumatic radial tire for the motorcycle according to claim 2, wherein said textile-reinforcing layer is composed of one or more combinations selected from groups including the following textile structuring members:

(A) a folded-back portion of said carcass ply;

(B) an upper end portion of a flipper disposed so as to contain said bead core and a bead apex disposed on the outside thereof in the tire radial direction;

(C) an upper end portion of a chafer ply disposed on the inside of said folded-back portion of said carcass ply in the tire radial direction; and (D) an upper end portion of a side-reinforcing ply disposed below to above the position of a maximum tire width.

6. The pneumatic radial tire for the motorcycle according to claim 2, wherein a side-reinforcing outer rubber layer (a) whose JIS-A hardness is more than 55 and less than 90;

(b) whose thickness t meets a requirement of $0.1 \leq t/BCW \leq 0.7$ with respect to the bead core maximum width BCW; and (c) height H from a bead heel portion to an upper end thereof and its disposed length L in the tire radial direction meet requirements of $0.3 \leq H/SH \leq 0.9$ and $0.1 \leq L/SH \leq 0.7$, respectively, with respect to the height SH from the bead heel portion to the end of the crown in a no-load state in which the belt is attached to a standard rim and a standard inner pressure is filled.

7. The pneumatic radial tire for the motorcycle according to claim 3, wherein a side-reinforcing outer rubber layer (a) whose JIS-A hardness is more than 55 and less than 90;

(b) whose thickness t meets a requirement of $0.1 \leq t/BCW \leq 0.7$ with respect to the bead core maximum width BCW; and (c) height H from a bead heel portion to an upper end thereof and its disposed length L in the tire radial direction meet requirements of $0.3 \leq H/SH \leq 0.9$ and $0.1 \leq L/SH \leq 0.7$, respectively, with respect to the height SH from the bead heel portion to the end of the crown in a no-load state in which the belt is attached to a standard rim and a standard inner pressure is filled.

8. A pneumatic radial tire for a motorcycle, comprising a tread portion, a pair of sidewall portions;

bead portions, a carcass ply comprising a layer of textile cords;

a layer of mono-spiral belt that reinforces the tread portion around the carcass ply;

the mono-spiral belt comprises steel cords whose tensile break strength is 147 MPa or more;

a value Tc of a number of driven cords of the mono-spiral cords per 25 mm in width at an equator of the tire and a value Ts at shoulder parts meet requirements of $17 \leq Tc \leq 24$ and $0.6 \leq Ts/Tc \leq 0.9$;

a disposed width BW of the mono-spiral cords meets a requirement of $0.6 \leq BW/TW \leq 1.0$ with respect to a total width TW of the crown portion in a no-load state in which the belt is attached to a standard rim and a standard inner pressure is filled;

at least one layer of a textile-reinforcing layer having a tensile break strength of 98 MPa or higher is disposed at both ends of the mono-spiral belt; and an overlap of the mono-spiral belt with the textile-reinforcing layer is 4 to 10 times of a diameter D of the steel cords of the mono-spiral belt.

* * * * *